United States Patent [19]

Sasaki et al.

[11] Patent Number: 4,890,256

[45] Date of Patent: Dec. 26, 1989

[54] DOCUMENT EDITING APPARATUS HAVING DOCUMENT COLLATOR FUNCTION

[75] Inventors: Hideki Sasaki; Shigeru Matsuoka, both of Hitachi; Eiji Matsuda, Takahagi; Hitoshi Yonenaga; Masahito Fukushima, both of Hitachi, all of Japan

[73] Assignee: Hitachi, Ltd., Tokyo, Japan

[21] Appl. No.: 130,658

[22] Filed: Dec. 9, 1987

[30] Foreign Application Priority Data

Dec. 15, 1986 [JP] Japan .............................. 61-296722

[51] Int. Cl.$^4$ ............................................ G06F 15/20
[52] U.S. Cl. ................................. 364/900; 364/928; 364/928.2; 364/927.2; 364/947; 364/947.6; 364/943
[58] Field of Search ................................. 364/200, 900

[56] References Cited

U.S. PATENT DOCUMENTS 4,464,730  8/1984  Lawrence et al. ................. 364/900

Primary Examiner—Raulfe B. Zache
Attorney, Agent, or Firm—Antonelli, Terry & Wands

[57] ABSTRACT

A check up key and a check up display speed key are provided on the inputting apparatus. When the check up key is inputted, a check up display speed controlling apparatus displays the character line of the already inputted document with a continuous shifting of the character line of the already inputted document. When the check up display speed key is inputted, the check up display speed controlling apparatus changes the check up display speed for the display. During the check up of the already inputted document, the character line of the already inputted document is displayed with a continuous shifting and also the check up display speed for the display is set freely, so that the character line of the already inputted document can be edited easily.

10 Claims, 6 Drawing Sheets

DOCUMENT EDITING APPARATUS HAVING DOCUMENT COLLATOR FUNCTION

BACKGROUND OF THE INVENTION:

1. Field of the Invention

The present invention relates to a document editing apparatus and, more particularly to a document editing apparatus suitable for the check up or collation of the already inputted document in a displaying apparatus when the displaying apparatus having a small display capacity of the document editing apparatus is used therein.

2. Prior Art

Recently a small sized and a low priced personal type Japanese word processor has been improved at a rapid rate. However, the conventional personal type Japanese word processor disclosed in, for example OA Personal Computer, a separate volume, "One's favorite word processor", has a displaying apparatus having a small size displaying scope thereon. The displaying apparatus displays only several characters or character lines having several lines at a time.

Owing to the above structure of the displaying apparatus having the small size displaying scope of the conventional document editing apparatus, it is hard to confirm the correction of the document, which has been inputted already, and also to grasp the context of the meaning of the sentence of the already inputted document during the document editing process. There is no consideration given to the improvement of the operational technique for grasping the context of the meaning of the sentence of the already inputted document during the inputting working operation of the document editing apparatus.

In the conventional personal type Japanese word processor, the content of the already inputted document is confirmed by the method in which the content of the already inputted document on the displaying scope in the document editing apparatus is renewed through the plural times working operations of the displaying scope controlling key such as the cursor key etc.. However, it is hard to deal with in the document editing apparatus on account of a lot of the key operation must be performed for grasping the context of the meaning of the sentence of the already inputted document.

A method has been known in which the content of the sentence in the already inputted document is confirmed by the trial printing utilizing the printing apparatus, however in this method the printing papers are a waste. At the document editing apparatus having the separated printing apparatus, it has an inconvenience that the confirmation of the already inputted document is impossible for want of the printing apparatus at all times.

In the conventional personal type Japanese word processor having the small size displaying apparatus in which a number of the character lines are displayed, a displayed line has only ten (10) characters, for example. Such a displayed line having only ten (10) characters is smaller than one line having about forty (40) characters in one sentence of the ordinary document. As a result, although the displaying apparatus having a number of the character lines are practicable, only a part of one sentence of the already inputted document is displayed virtually in the displaying apparatus. Accordingly it is difficult to check up the already inputted document as a series of a continuous one in the conventional personal type Japanese word processor having the small size displaying apparatus.

The content of the already inputted document in the conventional personal type Japanese word processor having the displaying apparatus is confirmed by a method in which the content of the already inputted document in the displaying scope is renewed through the plural times working operations of the key such as the cursor key etc.. It is hard to deal with on account of a lot of the key working operations for grasping the context of the already inputted document in the conventional personal type Japanese word processor having the displaying apparatus.

In a lap top type English word processor, the above inconveniences will occur because displaying apparatus has a small displaying scope thereon.

SUMMARY OF THE INVENTION:

An object of the present invention is to provide a document editing apparatus having a small capacity displaying scope, wherein a series of the character line of the already inputted document can be displayed to check up easily with a simple working operation.

Another object of the present invention is to provide a document editing apparatus having a small capacity displaying scope, wherein a series of the character lines of the already inputted document can be displayed to check up use a plurality of different check up display speeds.

In accordance with the present invention, the document editing apparatus includes an inputting means for inputting a character code and a controlling code, a displaying means for displaying the character code and the controlling code inputted by the inputting means, and a controlling means for editing and writing out a document in accordance with the character code and the controlling code inputted by the inputting means and for displaying the document on the displaying means.

A check up key and a check up display speed key are provided respectively on the inputting means, a check up display controlling means for displaying a character line of the already inputted document with a continuous shifting on the displaying means is provided on the editing and writing out controlling means in accordance with an input of the check up key, and a check up display speed controlling means for changing a check up display speed of the displaying means is provided on the editing and writing out controlling means in accordance with the input of the check up display speed key.

When the check up key of the inputting means is inputted, the check up display speed controlling means displays the character line of the already inputted document on the displaying means with a continuous shifting of the character line of the already inputted document. When the check up display speed key is inputted, the check up display speed controlling means changes the check up display speed or check up shift speed for the display on the displaying apparatus.

According to the present invention, during the check up of the already inputted document in the document editing apparatus, the character line of the already inputted document is displayed with a continuous shifting and also the check up display speed or check up shift speed for the display on the displaying apparatus is set freely, so that the character line of the already inputted document can be edited easily.

BRIEF DESCRIPTION OF THE DRAWINGS:

FIG. 6 is an explanatory view showing one example of the already inputted document according to one embodiment of the present invention;

FIG. 7 is an explanatory view showing one example of the document in which the broken line area of the already inputted document shown in FIG. 6 is illustrated;

FIG. 8 is an explanatory view showing the displaying scope under the check up processing execution according to one embodiment of the present invention;

FIG. 9 is an explanatory view showing the displaying scope in which the character is shifted at one character rate through the display address renewing processing with the displaying scope shown in FIG. 8;

FIG. 10 is an explanatory view showing the message scope for selecting the check up display speed on the displaying scope of the displaying apparatus according to one embodiment of the present invention.

Embodiments of the Invention:

One embodiment of a document editing apparatus according to the present invention will be explained with referring to drawings.

Figure 2:
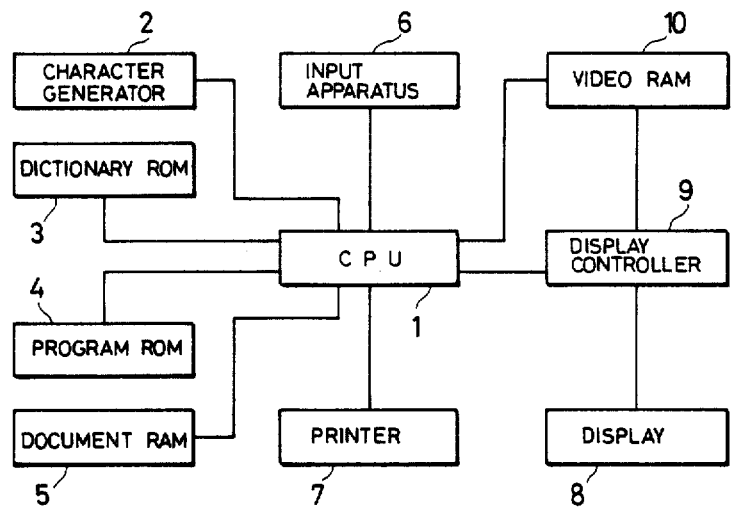
FIG. 2 is a block diagram of the document editing apparatus according to one embodiment of the present invention.

FIG. 2 is a block diagram view showing a document editing apparatus according to one embodiment of the present invention. The document editing apparatus includes a central processing unit (CPU) 1 for controlling generally the document editing apparatus, a character generator (CG) 2 being housed in the form of characters, a dictionary memory (ROM) 3 being housed in form of a dictionary such as a word etc., a programming memory (ROM) 4 for memorizing the program in which the various functions as the document editing apparatus are carried out, and a document memory (RAM) 5 for housing the information of the document such as the character, the code etc., the document memory (RAM) 5 is one in which the read on function and the write in function can be performed at any time.

The document editing apparatus of one embodiment of the present invention includes further an inputting apparatus 6 such as plural striking key type key board for inputting the character code such as the character, the mark etc. or the controlling code such as the line feed, a printing apparatus 7 for printing a hard copy of the already inputted document, a displaying apparatus 8 for displaying the inputted character code etc. or the edited document and the produced document, the displaying apparatus 8 is, for example, a liquid crystal (LC) element in which horizontal ten (10) characters and vertical three (3) lines can be displayed, a video memory (RAM) 10 is a memory corresponding to each displayed dot of the liquid crystal (LC) displaying element of the displaying apparatus 8, and a display controller 9 for driving the liquid crystal (LC) of the liquid crystal (LC) displaying element in accordance with the content of the video memory (RAM) 10.

In the above document editing apparatus structure of the present invention, when the power source of the document editing apparatus is inputted, the document editing function is executed by the central processing unit (CPU) 1 and the programming memory (ROM) 4. The character, which corresponds to the character code etc. inputted from the inputting apparatus 6, is collated with the dictionary in the dictionary memory (ROM) 3, and the corresponding character pattern is read from the character generator (CG) 2 and is housed in the video memory (RAM) 10. The content of the already inputted document housed in the video memory (RAM) 10 is displayed on the liquid crystal (LC) displaying apparatus 8 by the display controller 9.

The document is edited by repeating the above stated processing. The content of the already inputted document is housed in the document memory (RAM) 5. The printing of the already inputted document is executed by the operation of the printing apparatus 7 with the central processing unit (CPU) 1 via the driver mechanism (not shown).

Figure 3:
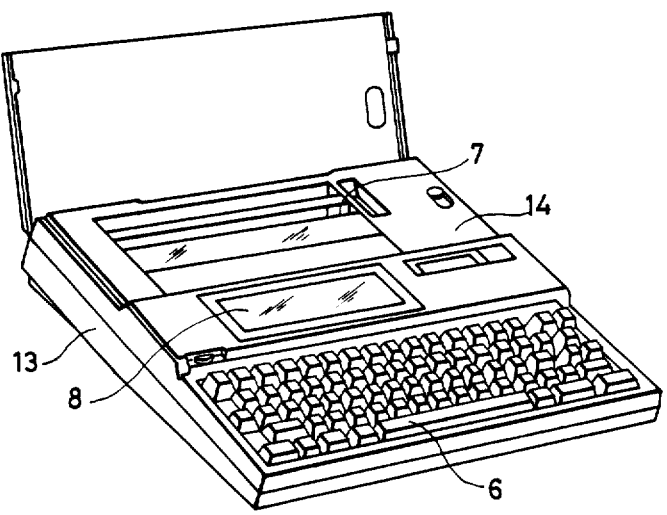
FIG. 3 is an external appearance of the document editing apparatus according to one embodiment of the present invention.

FIG. 3 is an external appearance of the document editing apparatus according to one embodiment of the present invention. The document editing apparatus comprises the inputting apparatus 6, the displaying apparatus 8, the printing apparatus 7, a case main body 13 for housing the above stated apparatuses group, and a whole controlling portion 14 for housing the others portion including the central processing unit (CPU) 1 as shown in FIG. 2.

Figure 4:
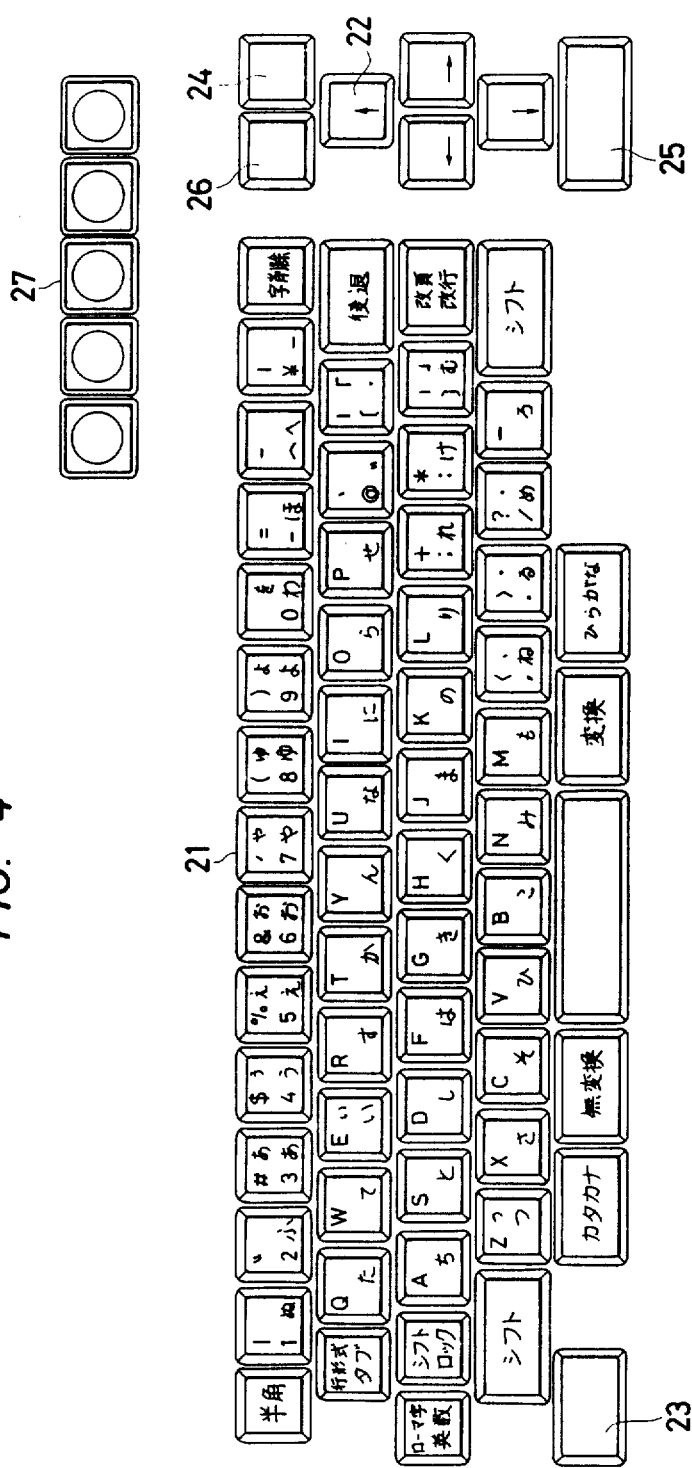
FIG. 4 is a plan view showing the inputting apparatus of the document editing apparatus according to one embodiment of the present invention.

FIG. 4 is a plan view of the inputting apparatus 6. The inputting apparatus 6 comprises a character key group 21 for indicating the input of the character, a cursor key 22 for indicating the movement of the cursor, a function key group 27 for indicating the document editing function such as insertion or deletion, etc. or the function such as printing etc., a cancel key 23, a check up key 24, an execution key 25, and a check up display speed key or check up shift speed key 26.

Next, the check up function of the document editing apparatus of the present invention will be explained with FIG. 1 and FIGS. 5–11.

Figure 1:
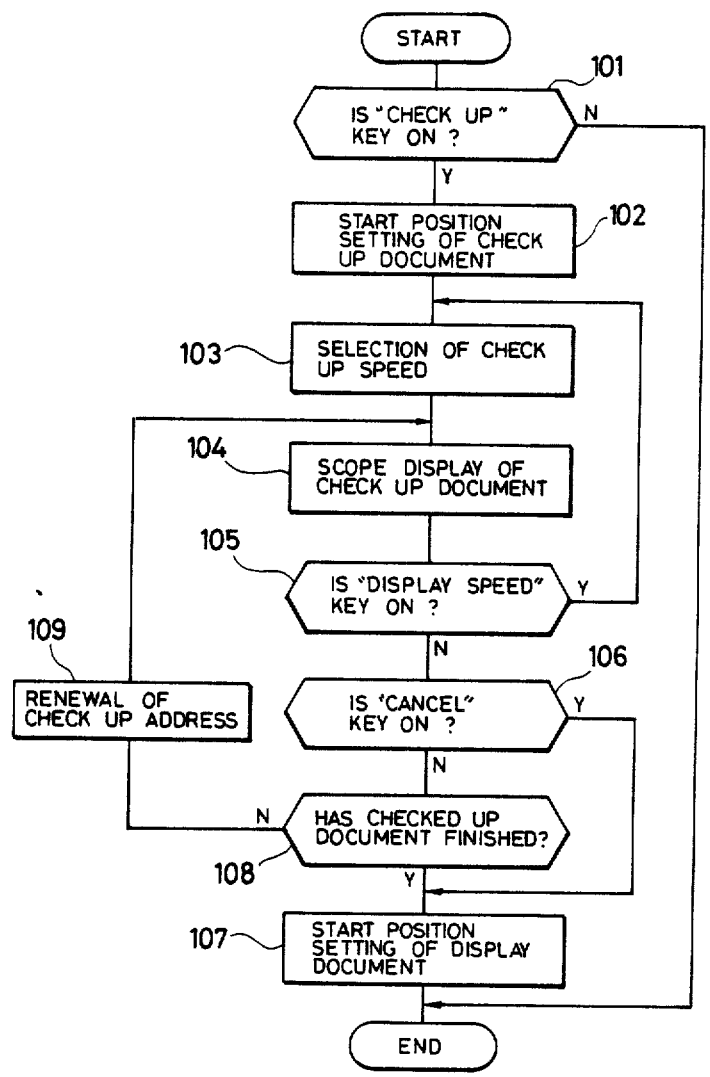
FIG. 1 is a processing flow chart of the check up display processing of the already inputted document in a document editing apparatus according to one embodiment of the present invention.
Figure 5:
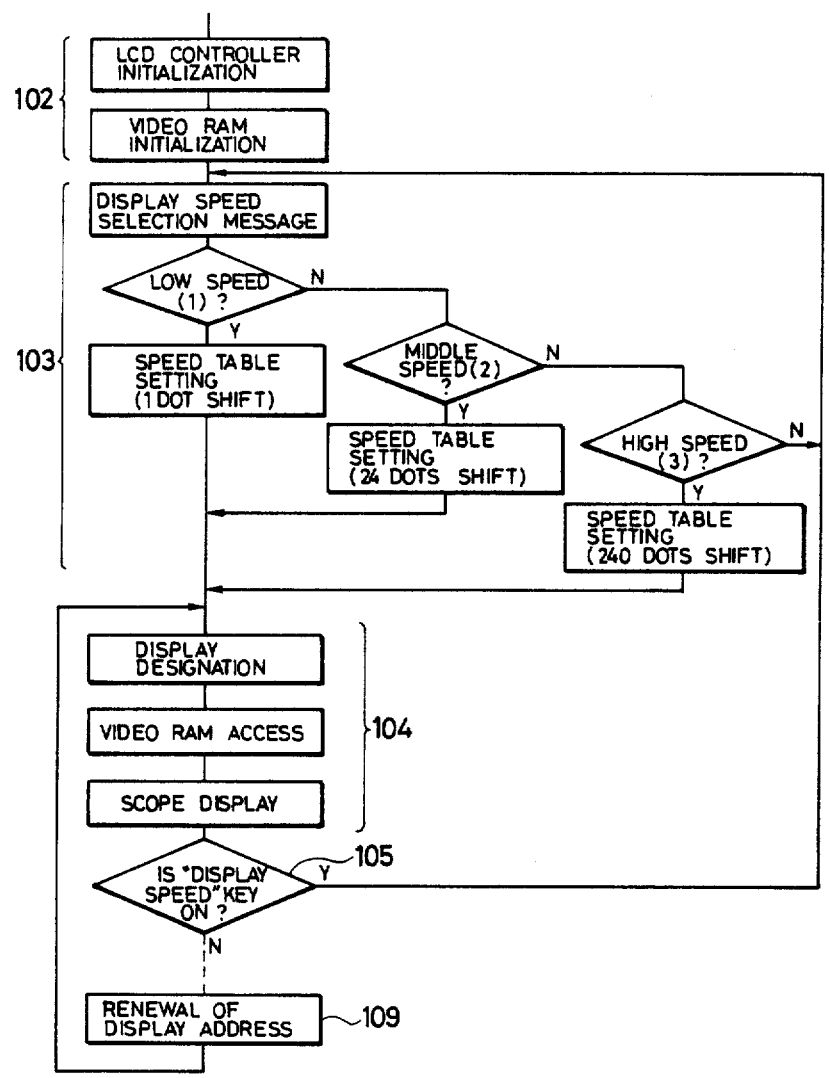
FIG. 5 is a processing flow chart of the check up display processing of the already inputted document in a document editing apparatus according to another embodiment of the present invention.
Figure 11:
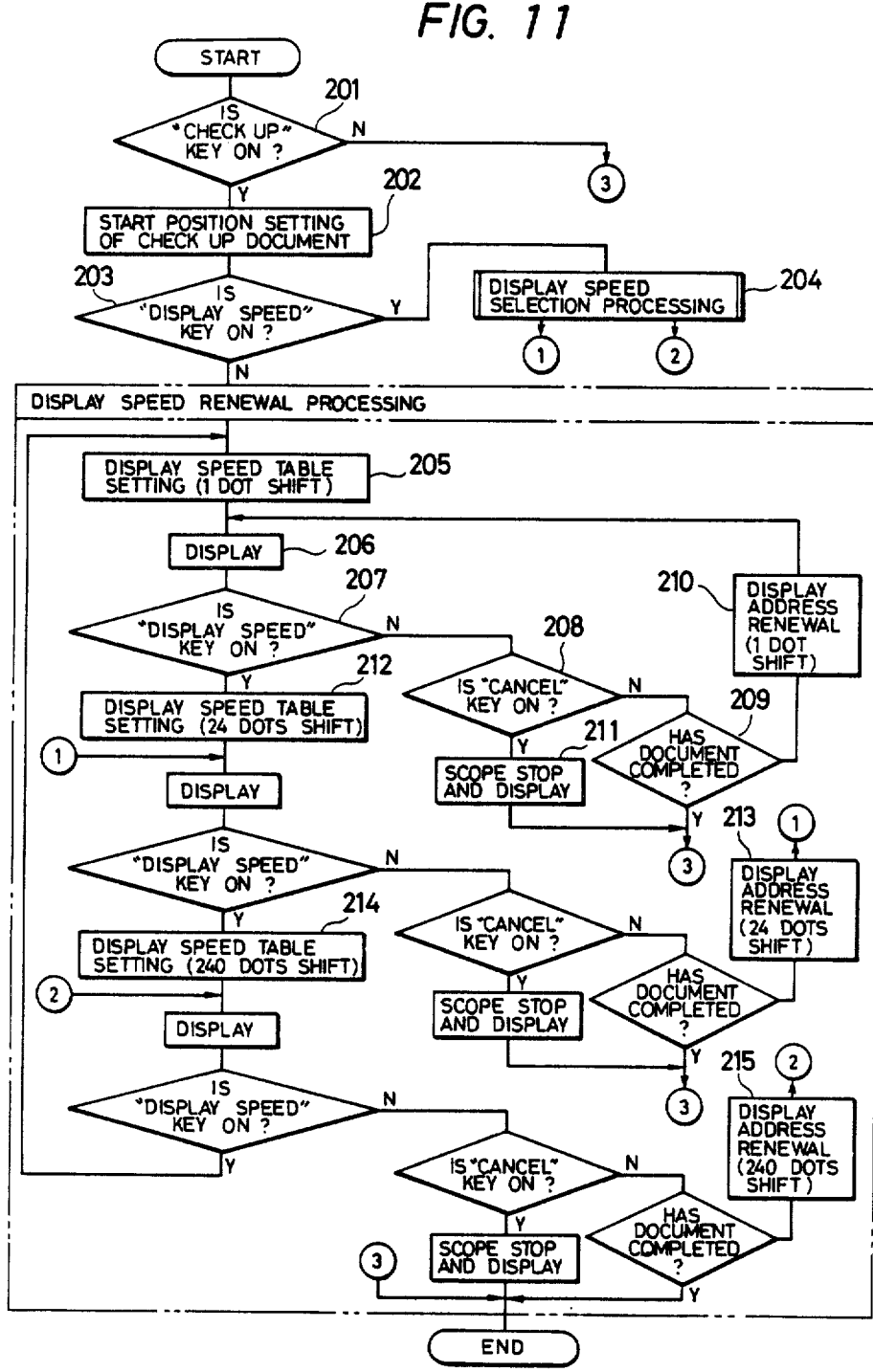
FIG. 11 is a processing flow chart of the check up display processing of the already inputted document in a document editing apparatus according to a further embodiment of the present invention.

FIGS. 1, 5 and 11 are processing flow charts showing a part of the check up displaying processing in the document check up function of the document editing apparatus according to one embodiment of the present invention, respectively.

FIG. 6 is an explanatory view of the already inputted document being the basis and illustrates the document of twenty two (22) characters and six (6) lines for convenience. FIG. 7 is an example view displaying the already inputted document shown in FIG. 6 on the displaying scope of the displaying apparatus 8, in which a broken line area shown in FIG. 6 is displayed. In FIG. 7, 51 denotes a displaying scope frame of the displaying apparatus 8, and 51 denotes a document character area, respectively.

FIG. 8 shows a displaying scope under the check up displaying processing execution utilizing the document editing apparatus according to the present invention. In the check up displaying processing for the already inputted document, the content of displaying scope of the displaying apparatus 8 is as follows. At the second line of the displaying scope of the displaying apparatus 8, a next character line continuing a displayed character line of the first line is displayed. At the third line of the displaying scope of the displaying apparatus 8, a next character line continuing a displayed character line of the second line is displayed, respectively. Namely, in the displaying scope of the displaying apparatus 8, the character line for the already inputted document is displayed continuously with the context of the meaning of the sentence, and the check up facility for the already inputted document under the check up displaying execution can be realized.

FIG. 9 shows the condition in which the displayed character of the already inputted document is shifted at one character rate through the display address renewing processing with the above stated displaying scope shown in FIG. 8.

The broken line in the displaying scope shown in FIGS. 7-9 shows respectively a displaying scope of one character for convenience and is not shown on the displaying scope as a practical matter.

FIG. 10 is an example showing a message scope for selecting the check up display speed or check up shift speed displayed on the displaying scope of the displaying apparatus 8 for check up function of the already inputted document. At the document character area 51 in FIG. 10, the first line displays "Speed : 1 2 3" and the third line displays "Execute after the selection by the cursor'".

Next, one example of the working operation procedure and the internal processing etc. for the check up displaying in the already inputted document will be explained in accordance with the flow charts shown in FIGS. 1 and 5. In this example; the character is shifted so as to check up toward the left side every one character (24 dots) rate.

In the beginning, the presence of the input from the check up key 24 is judged by a processing 101 shown in FIG. 1. In case of the absence of the input, the processing 101 gets out of the check up processing routine. In case of the presence of the input, the processing 101 is moved toward the stage of a start position setting processing 102. In the start position setting processing 102, the start position setting of the check up document in the already inputted document for setting the start position of the display address is executed so as to indicate the forefront of the check up document.

Subsequently, the processing 102 is moved toward the stage of a check up display speed selecting processing 103 for selecting check up display speed for the check up document. At the check up display speed selecting processing 103, the displaying scope is changed a message display condition for selecting the check up display speed of the check up document as shown in FIG. 10. The check up display speed of the check up document is determined by the check up display speed selected by the cursor key 22 of the inputting apparatus 6 and the input of the execution key 25.

In the video memory (RAM) 10, the character pattern corresponding to the character code etc. inputted by the inputting apparatus 6 is read on from the character generator (CG) 2 and written on. The character pattern written on the video memory (RAM) 10 is displayed on the liquid crystal (LC) displaying apparatus 8 by the display controller 9.

Next, a scope displaying processing 104 is executed. In the scope displaying processing 104, the check up document is shifted automatically at one character (24 dots) rate from right to left beginning from the forefront of the check up document and displayed in the displaying scope on the displaying apparatus 8.

In above case the check up shift of the check up document is practised from the right side to the left side in the horizontal line direction, the check up shift of the check up document may be practised at reverse order. The check up shift of the check up document may be practised from the upper side to the lower side at the longitudinal line direction or from the lower side to the upper side at the longitudinal line direction.

Here, when the check up display speed key 26 is pushed down, the processing is returned again from a processing 105 to the check up display speed selecting processing 103. In the processing 105, it is determined, whether the check up display speed key on or not. After a desirable check up display speed is selected by the cursor key 22, the displaying scope is displayed as a scope before the push down of the check up display speed key 26 by the pushing down of the execution key 25. The check up character line is displayed in accordance with the automatically continuous shifting as much as an amount of the indicated movement.

Next, "on" processing 106 of the cancel key 23 is executed. The processing 106 is executed so as to stop the check up function display. When the cancel key 23 is pushed down, the start position setting processing 107 of the displayed document is executed. After the display of the forefront of the check up document is set, the check up document processing routine is completed. When the cancel key 23 is not pushed down, the presence of the check up document completion is discriminated by the processing 108.

In case of the check up document completion, the start position setting processing 107 of the displayed document is executed. In case of no check up document completion, the display address renewing processing 109 is executed so as to shift the displayed character line as much as the amount of the indicated movement and returned to the scope displaying processing 104 for displaying the above state. Thereafter, the check up function for the already inputted document can be realized by the repeated operation of these processing.

The start position setting processing 102 of the check up document in the already inputted document, the check up display speed selecting processing 103 of the check up display speed and the scope displaying processing 104 of the check up document in the already inputted document will be explained in detail with FIG. 5.

After the completion of the check up function of the already inputted document, when it is necessary to amend the content of the already inputted document, such an amendment of the inputted document will be practised according to a suitable editing mode.

FIG. 11 is another embodiment of the present invention of the processing flow chart of the working operation procedure and the internal processing etc. for the check up display. In this embodiment of the present invention, whenever the check up display speed key 26 is pushed down, the check up display speed table for renewing the display address is renewed and then the check up display speed is changed. Thereafter, the changing of check up display speed at three stages will be explained, for example, according to one dot (1 dot) shift, twenty four dots (24 dots; one (1) character) shift, and two hundreds and forty dots (240 dots; one (1) line rate; ten (10) characters rate).

In the beginning, the presence of the input of the check up key 24 is judged by the processing 201. In the absence of the input, the processing 201 gets out of the check up processing routine. When the input of the check up key 24 is presented, the processing 201 is moved toward the stage of a start position setting processing 202. In the start position setting processing 202, the start position setting of the check up document in the already inputted document for setting the start position of the display address is executed so as to indicate the forefront of the check up document.

Subsequently, the processing 201 is moved toward the stage of a processing 203. At the processing 203, the presence of the input of the check up display speed key 26 is determined. In case of the presence of the input, the processing 203 is moved toward the stage of a check up display speed selecting processing 204, and the above stated check up display speed selecting processing 204 is executed. When the input of the check up display speed key 26 does not present, the check up display speed selecting processing 204 is moved toward the stage of a check up display speed table setting processing 205. At the check up display speed table setting processing 205, "one (1) dot" is set on the check up display speed table for renewing the display address.

Next, in a document displaying processing 206, the check up document is displayed from the forefront of the already inputted document. In a processing 207, the presence of the input of the check up display speed key 26 is determined again. In the absence of the input, the processing 207 is moved toward the stage of a processing 208. The presence of the input of the cancel key 23 is determined in the processing 208. In the absence of the input, the processing 208 is moved toward the stage of a processing 209.

In the processing 209, it is determined whether the check up display document is completed or not. When the check up display document is not completed, the processing 209 is moved toward the stage of a display address renewing processing 210. In the display address renewing processing 210, the display address is shifted at one (1) dot rate and returned to the document displaying processing 206, the content of the display address of the check up document is displayed. Thereafter these processing are repeated.

In the processing 208, when the input of the cancel key 23 is presented, the shift of the displaying scope on the displaying apparatus 8 is stopped by a displaying scope stopping processing 211, then the processing 208 gets out of the check up processing routine. When the completion of the check up document is detected by the processing 209, the processing 209 gets out also of the check up processing routine.

At the processing 207, when the input of the check up display speed key 26 is presented, the processing 207 is moved toward the stage of a check up display speed table setting processing 212. In the check up display speed table setting processing 212, "twenty four (24) dots" are set on the check up display speed table. Thereafter, the similar above stated processing are repeated. However, in this case the check up shift amount at the display address renewing processing 213 is set to be twenty four (24) dots rate or one (1) character rate.

When the check up display speed key 26 is inputted, the display address renewing processing 213 is moved toward the stage of a check up display speed table setting processing 214. At the check up display speed table setting processing 214, "two hundreds and forty (240) dots" is set on the check up display speed table. The display address renewal is carried out at two hundreds and forty (240) dots rate or ten (10) characters rate in the processing 215.

Further, the check up display speed key 26 is inputted, the processing is carried out to set "one (1) dot" at the check up display speed table in the check up display speed table setting processing 205 and returns to "one (1) dot" shift display.

In the above embodiments of the present invention, the check up display speed for checking up the already inputted document is changed at three stages, however it is possible to set at any optional check up display speed and at any optional stage.

In the English word processor, the check up display speed for checking up the already inputted document can be changed, for example, three stages such as one (1) dot shift, one (1) word shift and one (1) character line shift.

We claim:

1. A document editing apparatus including:
   inputting means for inputting a character code and controlling code;
   displaying means for displaying the character code and the controlling code inputted by said inputting means; and
   controlling means, connected to said inputting means and said displaying means, for editing and writing out a document in accordance with the character code and the controlling code inputted by said inputting means and for displaying an already inputted document on said displaying means;
   wherein a check up key and a check up display speed key are provided respectively on said inputting means, wherein check up display controlling means, is included in said controlling means, for displaying a character line of the already inputted document with a continuous shifting on said displaying means in accordance with an input of said check up key, and wherein check up display speed controlling means, is further included in said controlling means, for changing a check up display speed at said displaying means in accordance with the input of said check up display speed key.

2. A document editing apparatus including:
   inputting means for inputting a character code and a controlling code;
   displaying means for displaying the character code and the controlling code inputted by said inputting means;
   printing means for printing the character code and the controlling code inputted by said inputting means; and
   controlling means, connected to said inputting means, said displaying means and said printing means, for editing and writing out a document in accordance with the character code and the controlling code inputted by said inputting means and for displaying an already inputted document on said display means;

wherein a check up key and a check up display speed key are provided respectively on said inputting means, wherein display controlling means, is included in said controlling means, for displaying a character line of the already inputted document with a continuous shifting on said displaying means in accordance with an input of said check up key, and wherein check up display speed controlling means, is further included in said controlling means, for changing a check up display speed of said displaying means in accordance with the input of said check up display speed key.

3. A document editing apparatus according to claim 1, wherein said check up display speed controlling means displays one dot of the already inputted document with one of the continuous shifting on said displaying means.

4. A document editing apparatus according to claim 1, wherein said check up display speed controlling means displays one character of the already inputted document with one of the continuous shifting on said displaying means.

5. A document editing apparatus according to claim 1, wherein said check up display speed controlling means displays one word of the already inputted document with one of the continuous shifting on said displaying means.

6. A document editing apparatus according to claim 1, wherein said check up display speed controlling means displays one character line of the already inputted document with one of the continuous shifting on said displaying means.

7. A document editing apparatus according to claim 2, wherein said check up display speed controlling means displays one dot of the already inputted document with one of the continuous shifting on said displaying means.

8. A document editing apparatus according to claim 2, wherein said check up display speed controlling means displays one character of the already inputted document with one of the continuous shifting on said displaying means.

9. A document editing apparatus according to claim 2, wherein said check up display speed controlling means displays one word of the already inputted document with one of the continuous shifting on said displaying means.

10. A document editing apparatus according to claim 2, wherein said check up display speed controlling means displays one character line of the already inputted document with one of the continuous shifting on said displaying means.

* * * * *